United States Patent [19]

Yamada

[11] 4,179,086

[45] Dec. 18, 1979

[54] ARMY RESTRAINT SYSTEM

[75] Inventor: Edwin Y. Yamada, Orange, Calif.

[73] Assignee: The United States of America as represented by the Secretary of the Air Force, Washington, D.C.

[21] Appl. No.: 926,361

[22] Filed: Jul. 20, 1978

[51] Int. Cl.² .............................................. B64D 25/02
[52] U.S. Cl. ........................ 244/122 AG; 244/122 B; 280/801; 280/748
[58] Field of Search ............... 244/121, 122 R, 122 A, 244/122 AE, 122 AG, 122 AH, 122 B; 280/744–748

[56] References Cited

U.S. PATENT DOCUMENTS

| | | | |
|---|---|---|---|
| 2,929,587 | 3/1960 | Martin | 244/122 AG |
| 3,202,384 | 8/1965 | Martin | 244/122 AG |
| 3,239,273 | 3/1966 | Pitney | 244/122 AG |
| 3,287,064 | 11/1966 | Freeman | 244/122 B |
| 3,957,231 | 5/1976 | Miller et al. | 244/122 AG |

*Primary Examiner*—Galen L. Barefoot
*Attorney, Agent, or Firm*—Joseph E. Rusz; Arsen Tashjian

[57] ABSTRACT

An arm restraint system for use with an aircraft ejection seat to prevent limb flailing on ejection. Long straps, which are normally loose to allow unimpeded arm and body movement of the seated crewman, are retained high on the side of the shoulder area by a flap with a Velcro fastener and by ring members on the seat buckle and on the seat frame. During the ejection sequence, the Velcro fasteners are pulled apart by the action of the straps which move downward and pin the crewman's arms against his side and lower abdomen thereby preventing flail upon entry of the crewman into the airstream.

2 Claims, 2 Drawing Figures

ARMY RESTRAINT SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to an arm restraint system for attachment to an aircraft ejection seat and, more particularly, the invention is concerned with providing a system which includes a strap retention device allowing unimpeded arm and body movement until ejection at which time the straps are retracted causing the crewman's arms to be pinned against his side and lower abdomen during ejection.

The restraining of an occupant's body from movement relative to his seat both prior to and immediately after ejection from a high speed aircraft is necessary in order to prevent possible physical damage caused by forces of the ejection gun or rocket acting on various parts of the occupant's body. Also, after ejection, extensive bodily damage can occur especially to the arms and legs when the windstream around the aircraft hits the body.

Injury during ejection is greatly increased by the flailing of the limbs when subjected to ram air pressure which is encountered during the initial stages of ejection. Limb flailing can result in fractures, dislocations, traumatic amputations and/or other irrepairable physical limb damage. The danger is particularly acute in the case of arms because the airman may have an arm outstretched at the time of ejection and this arm would be subjected to the full force of the airstream on ejection.

The present invention provides an arm restraint system suitable for use in an emergency escape situation wherein an ejection seat with the occupant seated therein is ejected from the fast moving aircraft. The system is capable of quickly pulling the arms of the airman to a safe position for protection from airblast which occurs immediately after ejection.

SUMMARY OF THE INVENTION

The present invention is concerned with providing an arm restraint system wherein long straps which are normally loosely retained to the crewman are retracted during seat/crewman ejection. A strap retention device in the form of a folded Velcro flap positioned in the shoulder area serves to hold the strap in place ready for operation during an emergency. During the ejection sequence, the restraint straps are retracted causing the folded Velcro flap to unfold thereby allowing the restraint straps to slide down the arm and pin the crewman's arms against his sides and lower abdomen.

Accordingly, it is an object of the invention to provide an arm restraint system for use on an aircraft ejection seat wherein the seated crewman is allowed to have substantially unimpeded arm and body movement prior to ejection thereby maximizing crewman comfort.

Another object of the invention is to provide an arm restraint system wherein the arm restraint strap is retained at a specific point on the shoulders of the crewman to allow for swift and reliable restraint strap release upon strap retraction with a low release force required.

Still another object of the invention is to provide an arm restraint system wherein the strap retainer is not required to be attached directly to the crewman.

A further object of the invention is to provide an arm restraint system which is capable of accommodating the 5th through 95th percentile anthropometric dimensions of USAF crewmen while allowing rapid crewman ingress and egress.

A still further object of the invention is to provide an arm restraint system wherein the restraint strap is prevented from snagging on pencils and/or pens contained in the sleeve pockets of the crewman's outer garments.

Another still further object of the invention is to provide an arm restraint system which is simple to produce and requires no unusual materials or processes. Also, the system is relatively unaffected by variations in temperature, atmospheric pressure, vibration, acoustic noise, electromagnetic radiation, humidity, salt fog and spray, sand and dust, explosive decompression, solar radiation and corrosive atmospheres.

These and other objects, features and advantages will become more apparent after considering the following detailed description taken in conjunction with the attached drawings and appended claims.

DESCRIPTION OF A PREFERRED EMBODIMENT

Figure 1:
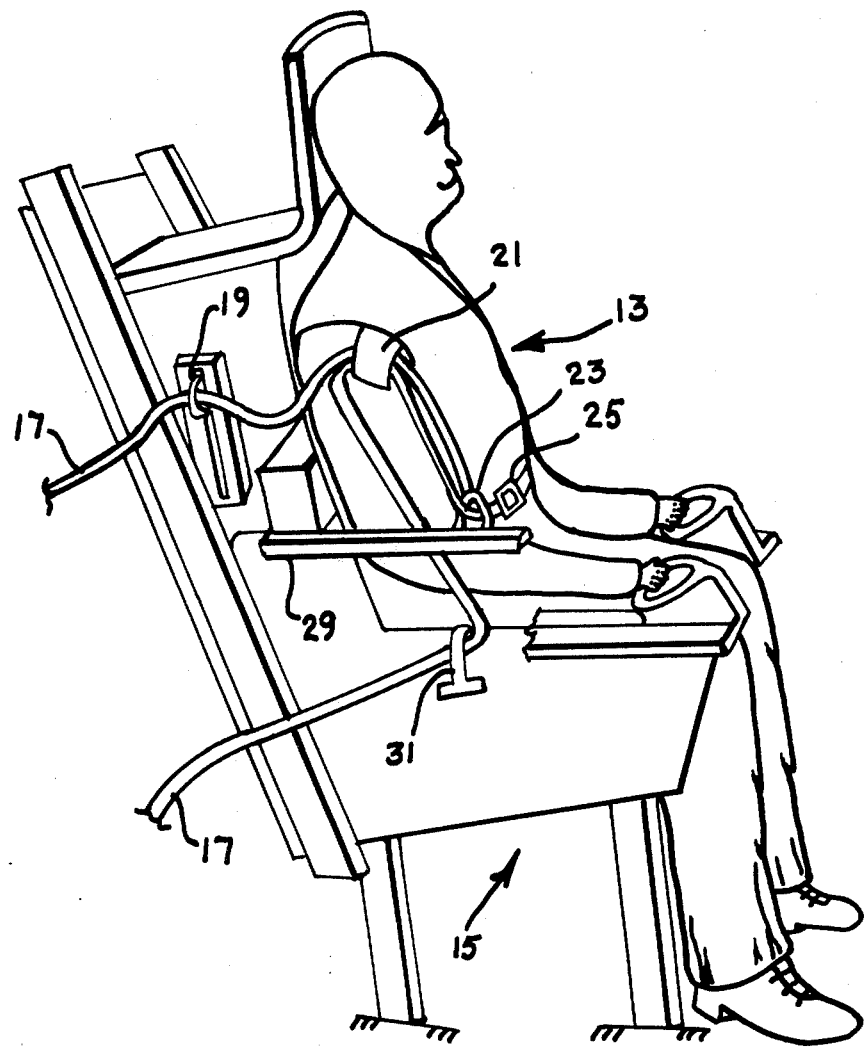
FIG. 1 is a side view of a crewman in unrestrained working position in the ejection seat showing the arm restraint straps in place through the shoulder loop.

Referring now to the Figures wherein like reference numerals refer to like elements in both views, FIG. 1 shos a crewman 13 seated in a normal position in an ejection seat 15 of an aircraft. The crewman 13 is capable of performing all of the necessary movements required to operate the aircraft without hindrance from the device of this invention. Before the flight, the restraint strap 17 is passed through the first ring member 19 fixedly attached to the side of the upper back rest of the ejection seat 15. The strap 17 is then passed by an unfolded shoulder flap 21, down through a second ring member 23 attached to the crewman's seat belt 25, and back up to the unfolded shoulder flap 21. The flap 21 is then folded up so that the portions 27 thereon, which adhere when pressed together, form a loop in which the strap 17 is held. The strap 17 then passes downward between the crewman's arm and the arm rest 29 of the ejection seat 15 and through a third ring member 31 which is affixed to lower side portion of the ejection seat 15. The strap 17 is then passed back to the point of origin so that tension can be applied thereto.

Figure 2:
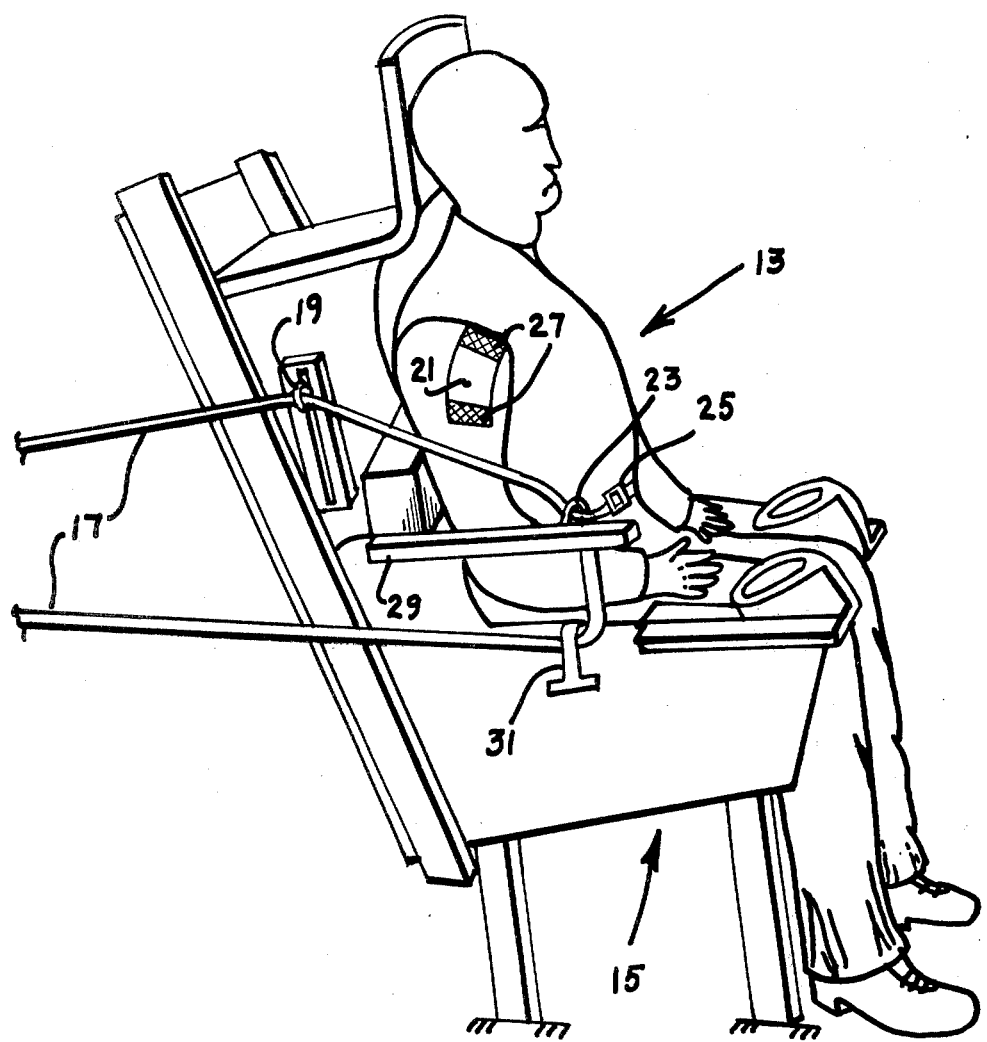
FIG. 2 is a side view of the crewman in the ejection seat immediately prior to ejection showing the arm restraint straps pulled out of the shoulder loop and back downward holding the arms in the restrained position.

In FIG. 2, the strap 17 is shown pulled back in the retracted position. The previously folded shoulder flap 21 has unfolded as a result of the downward force exerted by the restraint strap 17 as it is retracted. The portions 27 of the flap 21 may be made of Velcro (Registered Trademark) or the like or any other suitable arrangement which would separate and allow the flap 21 to unfold when a force is applied thereto. The strap 17 then slides down the arm of the crewman 13 pressing it inwardly against his body. The section of the strap 17 between the second ring member 23 attached to the crewman's belt 25 and the third ring member 31 pressed the lower part of the crewman's arm against his lower abdomen. The arm is now restrained so that no flailing can occur on ejection.

The loop in the folded flap 21 suspends the arm restraint strap 17 therein so that the strap 17 can move laterally through the loop without dragging appreciably as shown in FIG. 1. The releasing force which is produced by the downward pull on the arm restraint strap 17, causes a shear load between the adhering surfaces 27 preferably made of Velcro or like material. When the flap 21 unfolds, the lower part thereof falls over the pencil/pen sleeve pocket of the crewman thereby preventing the strap 17 from becoming snagged by covering the projecting ends of the pencils and pens.

It should be noted that the hereinbefore described arm restraint system is resistant to fluctuations in magnitude and direction of gravity loading which is very important during aerobatic maneuvers and emergency situations. Also, the action of the arm restraint system is automatic and requires no effort or thought on the part of the crewman to initiate operation during the ejection sequence.

Although the invention has been illustrated in the accompanying drawings and described in the foregoing specification in terms of a preferred embodiment thereof, the invention is not limited to this embodiment. It will be apparent to those skilled in the art that certain changes, modifications and substitutions can be made in the hereinbefore described invention, particularly with regard to the construction details, without departing from the true spirit and scope of the appended claims.

Having thus set forth the nature of my invention, what I claim and desire to secure by Letters Patent of the United States is:

1. In combination, an aircraft ejection seat holding a crewman therein and an arm restraint system for use therewith comprising, a restraint strap, a first ring member fixedly attached to the upper back rest of the ejection seat, a foldable shoulder flap attached to the side of the outer garment of the crewman in the lower shoulder area, a second ring member attached to a seat belt around the crewman's abdomen, and a third ring member attached to the lower side portion of the ejection seat, said restraint strap extending through said first ring member, past said foldable shoulder flap through said second ring member, back past said foldable shoulder flap through said third ring member, said shoulder flap being folded upward to slidably dispose said restraint strap therein whereby retraction of said restraint strap causes said foldable shoulder flap to unfold allowing the strap to slide down the crewman's arm so that further retraction operates to press the arm tightly against the body thereby preventing flailing of the crewman's arms during and immediately after ejection.

2. The combination ejection seat and arm restraint system defined in claim 1 wherein said foldable shoulder flap includes areas on the upper and lower portions thereof which adhere to each other when pressed together during folding.

* * * * *

UNITED STATES PATENT AND TRADEMARK OFFICE
CERTIFICATE OF CORRECTION

PATENT NO. : 4,179,086
DATED : 18 December 1979
INVENTOR(S) : Edwin Y. Yamada

It is certified that error appears in the above–identified patent and that said Letters Patent are hereby corrected as shown below:

The Title as shown in item [54] and Column 1, line 1, should be changed to read:

ARM RESTRAINT SYSTEM

Signed and Sealed this

Fifteenth Day of April 1980

[SEAL]

Attest:

SIDNEY A. DIAMOND

Attesting Officer

Commissioner of Patents and Trademarks